United States Patent
Jiang

(10) Patent No.: US 10,757,135 B2
(45) Date of Patent: Aug. 25, 2020

(54) BOT CHARACTERISTIC DETECTION METHOD AND APPARATUS

(71) Applicant: Huawei Technologies Co., Ltd., Shenzhen (CN)

(72) Inventor: Wu Jiang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/372,923

(22) Filed: Apr. 2, 2019

(65) Prior Publication Data

US 2019/0230097 A1 Jul. 25, 2019

Related U.S. Application Data

(63) Continuation of application No. PCT/CN2017/087170, filed on Jun. 5, 2017.

(30) Foreign Application Priority Data

Oct. 25, 2016 (CN) .......................... 2016 1 0948753

(51) Int. Cl.
*H04L 29/06* (2006.01)
*G06F 21/56* (2013.01)
*G06F 21/53* (2013.01)

(52) U.S. Cl.
CPC ............ *H04L 63/145* (2013.01); *G06F 21/53* (2013.01); *G06F 21/56* (2013.01); *G06F 21/566* (2013.01);
(Continued)

(58) Field of Classification Search
CPC ....... H04L 63/145; H04L 29/06; H04L 63/20; H04L 63/1416; H04L 63/0209;
(Continued)

(56) References Cited

U.S. PATENT DOCUMENTS 8,381,301 B1 * 2/2013 Wilson .................. H04L 43/026
726/24
8,561,188 B1 * 10/2013 Wang .................. H04L 63/1425
713/176

(Continued)

FOREIGN PATENT DOCUMENTS

CN 102254120 A 11/2011
CN 102902924 A 1/2013
(Continued)

OTHER PUBLICATIONS

Lindorfer, M., et al., "Detecting Environment-Sensitive Malware," XP047372615, International Conference on Computer Analysis of Images and Patterns, Springer-Verlag Berlin Heidelberg, Sep. 20, 2011, 20 pages.

(Continued)

*Primary Examiner* — Darren B Schwartz
(74) *Attorney, Agent, or Firm* — Conley Rose, P.C.

(57) ABSTRACT

A bot characteristic detection method and apparatus, where the apparatus obtains a first dynamic behavior file and a second dynamic behavior file, where the first dynamic behavior file is a behavior file resulting from dynamic behavior detection performed on a malicious file in a first sandbox, and the second dynamic behavior file is a behavior file resulting from dynamic behavior detection performed on the malicious file in a second sandbox. The apparatus determines a bot characteristic of the malicious file based on a common characteristic of the first dynamic behavior file and the second dynamic behavior file.

20 Claims, 3 Drawing Sheets

(52) U.S. Cl.
CPC .......... *H04L 29/06* (2013.01); *H04L 63/0209* (2013.01); *H04L 63/1416* (2013.01); *H04L 63/20* (2013.01); *G06F 2221/033* (2013.01); *H04L 2463/144* (2013.01)

(58) Field of Classification Search
CPC .......... H04L 2463/144; H04L 63/1441; H04L 63/1425; G06F 21/56; G06F 21/53; G06F 21/566; G06F 2221/033
See application file for complete search history.

(56) References Cited

U.S. PATENT DOCUMENTS

| | | | |
|---|---|---|---|
| 8,782,791 B2* | 7/2014 | Sankruthi | G06F 21/566 726/24 |
| 9,106,692 B2 | 8/2015 | Smith et al. | |
| 9,241,010 B1* | 1/2016 | Bennett | H04L 63/1433 |
| 9,349,134 B1* | 5/2016 | Adams | G06F 21/53 |
| 9,542,554 B1* | 1/2017 | Salsamendi | G06F 16/1748 |
| 10,050,998 B1* | 8/2018 | Singh | H04L 63/1433 |
| 2006/0120284 A1* | 6/2006 | Kim | H04L 63/0227 370/230 |
| 2010/0031353 A1* | 2/2010 | Thomas | G06F 11/3604 726/22 |
| 2012/0124667 A1* | 5/2012 | Chiang | G06F 21/566 726/24 |
| 2012/0167161 A1* | 6/2012 | Kim | H04L 63/1408 726/1 |
| 2012/0167210 A1* | 6/2012 | Oro Garcia | H04L 63/1425 726/22 |
| 2012/0204264 A1* | 8/2012 | Jiang | H04L 41/12 726/23 |
| 2013/0117848 A1* | 5/2013 | Golshan | G06F 21/566 726/23 |
| 2013/0117849 A1* | 5/2013 | Golshan | G06F 21/53 726/23 |
| 2013/0133072 A1* | 5/2013 | Kraitsman | H04L 63/1408 726/23 |
| 2014/0137255 A1 | 5/2014 | Wang et al. | |
| 2014/0143825 A1* | 5/2014 | Behrendt | G06F 21/552 726/1 |
| 2014/0181975 A1* | 6/2014 | Spernow | G06F 21/562 726/23 |
| 2014/0215617 A1 | 7/2014 | Smith et al. | |
| 2014/0337836 A1* | 11/2014 | Ismael | G06F 21/56 718/1 |
| 2015/0096022 A1* | 4/2015 | Vincent | G06F 21/566 726/23 |
| 2015/0326588 A1* | 11/2015 | Vissamsetty | H04L 63/1491 726/23 |
| 2015/0326592 A1* | 11/2015 | Vissamsetty | H04L 63/1408 726/24 |
| 2016/0191547 A1* | 6/2016 | Zafar | H04L 63/1416 726/23 |
| 2016/0292419 A1 | 10/2016 | Langton et al. | |
| 2016/0328742 A1* | 11/2016 | Shiravi Khozani | G06F 21/53 |
| 2017/0171244 A1* | 6/2017 | Vissamsetty | H04L 63/1491 |
| 2017/0251016 A1* | 8/2017 | Niv | H04L 43/08 |

FOREIGN PATENT DOCUMENTS

| | | |
|---|---|---|
| CN | 104134019 A | 11/2014 |
| CN | 104866765 A | 8/2015 |

OTHER PUBLICATIONS

Foreign Communication From a Counterpart Application, European Application No. 17863527.2, Extended European Search Report dated Jul. 29, 2019, 10 pages.
Machine Translation and Abstract of Chinese Publication No. CN102902924, Jan. 30, 2013, 19 pages.
Machine Translation and Abstract of Chinese Publication No. CN104134019, Nov. 5, 2014, 23 pages.
Machine Translation and Abstract of Chinese Publication No. CN104866765, Aug. 26, 2015, 16 pages.
Foreign Communication From a Counterpart Application, PCT Application No. PCT/CN2017/087170, English Translation of International Search Report dated Aug. 10, 2017, 2 pages.
Foreign Communication From a Counterpart Application, PCT Application No. PCT/CN2017/087170, English Translation of Written Opinion dated Aug. 10, 2017, 3 pages.
Machine Translation and Abstract of Chinese Publication No. CN102254120, Nov. 23, 2011, 29 pages.
Foreign Communication From a Counterpart Application, Chinese Application No. 201610948753.4, Chinese Office Action dated Dec. 23, 2019, 6 pages.

* cited by examiner

BOT CHARACTERISTIC DETECTION METHOD AND APPARATUS

CROSS-REFERENCE TO RELATED APPLICATIONS

This application is a continuation of International Patent Application No. PCT/CN2017/087170 filed on Jun. 5, 2017, which claims priority to Chinese Patent Application No. 201610948753.4 filed on Oct. 25, 2016. The disclosures of the aforementioned applications are hereby incorporated by reference in their entireties.

TECHNICAL FIELD

The present disclosure relates to the field of computer security technologies, and in particular, to a bot characteristic detection method and apparatus.

BACKGROUND

A botnet is a one-to-many control network formed between an attacker and infected hosts after the attacker uses one or more propagation approaches to make a large quantity of hosts infected with a bot program, for example, sending a malicious file to a large quantity of hosts so that the hosts are infected with a bot program when receiving and running the malicious file. The infected hosts are zombie hosts. The attacker may control the zombie hosts in a one-to-many manner using command and control (C&C) channels. The botnet forms an attack platform, and using this platform, various cyberattack behaviors may be initiated, resulting in a breakdown of an application system of an attacked object, a leakage of personal privacy, and the like. These cyberattack behaviors include, for example, using the botnet to send spam to an attacked object or stealing a secret. Compared with a conventional behavior that the attacker attacks the attacked object using a single host, the botnet may cause more severe damage to the attacked object.

In other approaches, after a malicious file is detected, a bot characteristic is identified and extracted from the malicious file usually through manual analysis, and a malicious file received later is filtered out and blocked based on the bot characteristic. However, to evade detection, the attacker usually modifies a malicious file relatively frequently, and a large quantity of variants of the malicious file may be easily generated. The foregoing bot characteristic extraction method is relatively inefficient, and cannot be applied on a large scale.

SUMMARY

Embodiments of the present disclosure provide a bot characteristic detection method and apparatus to improve efficiency in extracting a bot characteristic.

According to a first aspect, an embodiment provides a bot characteristic detection method implemented by a gateway device. The bot characteristic detection method includes the following steps.

Step A. The gateway device obtains a first dynamic behavior file and a second dynamic behavior file.

The first dynamic behavior file is a behavior file resulting from dynamic behavior detection performed on a malicious file in a first sandbox. The second dynamic behavior file is a behavior file resulting from dynamic behavior detection performed on the malicious file in a second sandbox.

The dynamic behavior detection includes, when the malicious file is running, obtaining a series of behaviors initiated by the malicious file to an operating system during runtime, such as system service requesting, file reading and writing, registry modification, application programming interface (API) calling, and network access, and recording information corresponding to each behavior in a dynamic behavior file. For example, behavior information of a file reading and writing behavior includes an operator that executes an action, a path involved, and the like.

Step B. The gateway device determines a bot characteristic of the malicious file based on a common characteristic of the first dynamic behavior file and the second dynamic behavior file.

In the implementation solution of the first aspect, the malicious file is simulated to run in the sandboxes, and behavior files, to be specific, the dynamic behavior files, that record network behaviors of the malicious file in this running process are collected such that the bot characteristic is extracted from the dynamic behavior files. This entire process can be automated, thereby improving efficiency in extracting the bot characteristic. In addition, because dynamic behavior detection is performed on the same malicious file in at least two sandboxes, during bot characteristic extraction, extracting the bot characteristic from the common characteristic of the dynamic behavior files respectively output by the at least two sandboxes can avoid that the extracted bot characteristic includes character strings randomly padded by different sandboxes in the dynamic behavior files and a character string used to describe information about a sandbox (for example, an Internet Protocol (IP) address and a port address of the sandbox), thereby improving accuracy of the bot characteristic.

In a first implementation of the first aspect, the first dynamic behavior file includes a first session packet, the second dynamic behavior file includes a second session packet, a destination IP address of the first session packet is the same as a destination IP address of the second session packet, and a destination port of the first session packet is the same as a destination port of the second session packet.

Step B includes the following.

Step B11. The gateway device determines the bot characteristic of the malicious file based on a common characteristic of the first session packet and the second session packet.

With reference to the first implementation of the first aspect, in a second implementation of the first aspect, step B11 includes the following steps.

Step B21. The gateway device obtains a first preconfigured field. There are a plurality of methods for obtaining the first preconfigured field. For example, the first preconfigured field is stored in a first configuration table in a gateway device in advance, and the first preconfigured field is determined by reading the first configuration table. Optionally, the first preconfigured field included in the first configuration table may be updated at any time. Optionally, when a session packet is an application layer packet that is encapsulated using the Hypertext Transfer Protocol (HTTP), the first preconfigured field includes a payload field and/or a request field.

Step B22. The gateway device determines whether content in the first preconfigured field in the first session packet and content in the first preconfigured field in the second session packet contain a same character string, and if the content in the first preconfigured field in the first session packet and the content in the first preconfigured field in the second session packet contain a same character string, determine that the bot characteristic of the malicious file includes the character string and a location of the character string in the first preconfigured field.

With reference to the first implementation of the first aspect, in a third implementation of the first aspect, step B11 includes the following steps.

Step B31. The gateway device obtains a second preconfigured field and preset content in the second preconfigured field.

There are a plurality of obtaining methods. Optionally, the second preconfigured field and the preset content in the second preconfigured field are stored in a second configuration table in a gateway device in advance, and the second preconfigured field and the preset content in the second preconfigured field are determined by reading the second configuration table. Optionally, content in the second configuration table may be updated at any time. Optionally, when a session packet is an application layer packet that is encapsulated using the HTTP, the second preconfigured field includes an agent field, and preset content in the agent field includes information about a user that sends a request.

Step B32. When the second preconfigured field exists in the common characteristic of the first session packet and the second session packet, and content in the second preconfigured field in the common characteristic is different from the preset content, the gateway device determines that the bot characteristic includes the content in the second preconfigured field in the common characteristic.

With reference to the first implementation of the first aspect, in a fourth implementation of the first aspect, step B11 includes the following steps.

Step B41. The gateway device obtains a preprocessing operation rule, where the preprocessing operation rule instructs to remove a specified character in a packet.

There are a plurality of methods for obtaining the preprocessing operation rule. For example, the preprocessing operation rule is stored in a third configuration table in a gateway device in advance, and the preprocessing operation rule is determined by reading the third configuration table. Optionally, content in the third configuration table may be updated at any time.

There may be a plurality of preprocessing operation rules. For example, when a session packet is an HTTP packet, the preprocessing operation rule is used to instruct to remove at least one of the following character strings, an HTTP keyword in the session packet, a sandbox IP address and port in the session packet, or a central processing unit (CPU) type in the session packet. The HTTP keyword may be a character string such as GET or HTTP1.1.

Step B42. The gateway device obtains first remaining content from the first session packet and second remaining content from the second session packet according to the preprocessing operation rule, where the first remaining content is packet content in the first session packet except the specified character, and the second remaining content is packet content in the second session packet except the specified character.

Step B43. The gateway device determine the bot characteristic of the malicious file based on a common characteristic of the first remaining content and the second remaining content.

With reference to the first aspect, the first implementation of the first aspect, the second implementation of the first aspect, the third implementation of the first aspect, or the fourth implementation of the first aspect, in a fifth implementation of the first aspect, step A includes the following steps.

Step A11. The gateway device obtains a static behavior file and a dynamic behavior file that are output by the first sandbox, and a static behavior file and a dynamic behavior file that are output by the second sandbox.

The static behavior file output by the first sandbox is a behavior file resulting from static behavior detection performed on a to-be-detected file in the first sandbox. The static behavior file output by the second sandbox is a behavior file resulting from static behavior detection performed on the to-be-detected file in the second sandbox. The dynamic behavior file output by the first sandbox is a behavior file resulting from dynamic behavior detection performed on the to-be-detected file in the first sandbox. The dynamic behavior file output by the second sandbox is a behavior file resulting from dynamic behavior detection performed on the to-be-detected file in the second sandbox.

Step A12. The gateway device determines whether the to-be-detected file is a malicious file based on the static behavior file and the dynamic behavior file that are output by the first sandbox, and the static behavior file and the dynamic behavior file that are output by the second sandbox.

For example, weight-based scoring is performed on at least one exception item in the four files output by the first sandbox and the second sandbox, and whether the to-be-detected file is a malicious file is determined based on a scoring result.

Step A13. When the to-be-detected file is a malicious file, the gateway device determines that the dynamic behavior file output by the first sandbox is the first dynamic behavior file, and that the dynamic behavior file output by the second sandbox is the second dynamic behavior file.

With reference to the first aspect, the first implementation of the first aspect, the second implementation of the first aspect, the third implementation of the first aspect, or the fourth implementation of the first aspect, in a sixth implementation of the first aspect, step A includes the following steps.

Step A21. The gateway device obtains the malicious file.

There are a plurality of obtaining methods, for example, determining, through manual analysis, that a to-be-detected file is a malicious file, or receiving a malicious file sent by another device.

Step A22. The gateway device inputs the malicious file into the first sandbox and the second sandbox separately for dynamic behavior detection.

Step A23. The gateway device obtains a dynamic behavior file output by the first sandbox, and a dynamic behavior file output by the second sandbox.

A second aspect of the embodiments of the present disclosure provides a bot characteristic detection apparatus, including an obtaining module configured to obtain a first dynamic behavior file and a second dynamic behavior file, where the first dynamic behavior file is a behavior file resulting from dynamic behavior detection performed on a malicious file in a first sandbox, and the second dynamic behavior file is a behavior file resulting from dynamic behavior detection performed on the malicious file in a second sandbox, and a determining module configured to determine a bot characteristic of the malicious file based on a common characteristic of the first dynamic behavior file and the second dynamic behavior file.

It should be clarified that the obtaining module provided in this embodiment is configured to perform step A in the first aspect of the embodiments of the present disclosure, and the determining module provided in this embodiment is configured to perform step B in the first aspect of the embodiments of the present disclosure.

For details about specific implementation processes of step A and step B, refer to descriptions in the first aspect of the embodiments of the present disclosure. Details are not described again in this embodiment.

In a first implementation of the second aspect, the first dynamic behavior file includes a first session packet, the second dynamic behavior file includes a second session packet, a destination IP address of the first session packet is the same as a destination IP address of the second session packet, and a destination port of the first session packet is the same as a destination port of the second session packet.

The determining module is further configured to determine the bot characteristic of the malicious file based on a common characteristic of the first session packet and the second session packet.

It should be clarified that the determining module provided in this embodiment is configured to perform step B11 in the first aspect of the embodiments of the present disclosure. For details about a specific implementation process of step B11, refer to descriptions in the first aspect of the embodiments of the present disclosure. Details are not described again in this embodiment.

In a second implementation of the second aspect, the determining module is further configured to obtain a first preconfigured field, and determine whether content in the first preconfigured field in the first session packet and content in the first preconfigured field in the second session packet contain a same character string, and if the content in the first preconfigured field in the first session packet and the content in the first preconfigured field in the second session packet contain a same character string, determine that the bot characteristic of the malicious file includes the character string and a location of the character string in the first preconfigured field.

It should be clarified that the determining module provided in this embodiment is configured to perform step B21 and step B22 in the first aspect of the embodiments of the present disclosure. For details about specific implementation processes of step B21 and step B22, refer to descriptions in the first aspect of the embodiments of the present disclosure. Details are not described again in this embodiment.

In a third implementation of the second aspect, the determining module is further configured to obtain a second preconfigured field and preset content in the second preconfigured field, and when the second preconfigured field exists in the common characteristic of the first session packet and the second session packet, and content in the second preconfigured field in the common characteristic is different from the preset content, determine that the bot characteristic includes the content in the second preconfigured field in the common characteristic.

It should be clarified that the determining module provided in this embodiment is configured to perform step B31 and step B32 in the first aspect of the embodiments of the present disclosure. For details about specific implementation processes of step B31 and step B32, refer to descriptions in the first aspect of the embodiments of the present disclosure. Details are not described again in this embodiment.

In a fourth implementation of the second aspect, the determining module is further configured to obtain a preprocessing operation rule, where the preprocessing operation rule instructs to remove a specified character in a packet, obtain first remaining content from the first session packet and second remaining content from the second session packet according to the preprocessing operation rule, where the first remaining content is packet content in the first session packet except the specified character, and the second remaining content is packet content in the second session packet except the specified character, and determine the bot characteristic of the malicious file based on a common characteristic of the first remaining content and the second remaining content.

It should be clarified that the determining module provided in this embodiment is configured to perform step B41, step B42, and step B43 in the first aspect of the embodiments of the present disclosure. For details about specific implementation processes of step B41, step B42, and step B43, refer to descriptions in the first aspect of the embodiments of the present disclosure. Details are not described again in this embodiment.

With reference to the second aspect, the first implementation of the second aspect, the second implementation of the second aspect, the third implementation of the second aspect, or the fourth implementation of the second aspect, in a fifth implementation of the second aspect, the obtaining module is further configured to obtain a static behavior file and a dynamic behavior file that are output by the first sandbox, and a static behavior file and a dynamic behavior file that are output by the second sandbox, where the static behavior file output by the first sandbox is a behavior file resulting from static behavior detection performed on a to-be-detected file in the first sandbox, the static behavior file output by the second sandbox is a behavior file resulting from static behavior detection performed on the to-be-detected file in the second sandbox, the dynamic behavior file output by the first sandbox is a behavior file resulting from dynamic behavior detection performed on the to-be-detected file in the first sandbox, and the dynamic behavior file output by the second sandbox is a behavior file resulting from dynamic behavior detection performed on the to-be-detected file in the second sandbox, determine whether the to-be-detected file is a malicious file based on the static behavior file and the dynamic behavior file that are output by the first sandbox, and the static behavior file and the dynamic behavior file that are output by the second sandbox, and when determining that the to-be-detected file is a malicious file, determine that the dynamic behavior file output by the first sandbox is the first dynamic behavior file, and that the dynamic behavior file output by the second sandbox is the second dynamic behavior file.

It should be clarified that the obtaining module provided in this embodiment is configured to perform step A11, step A12, and step A13 in the first aspect of the embodiments of the present disclosure. For details about specific implementation processes of step A11, step A12, and step A13, refer to descriptions in the first aspect of the embodiments of the present disclosure. Details are not described again in this embodiment.

With reference to the second aspect, the first implementation of the second aspect, the second implementation of the second aspect, the third implementation of the second aspect, or the fourth implementation of the second aspect, in a sixth implementation of the second aspect, the obtaining module is further configured to obtain the malicious file, input the malicious file into the first sandbox and the second sandbox separately for dynamic behavior detection, and obtain a dynamic behavior file output by the first sandbox, and a dynamic behavior file output by the second sandbox.

It should be clarified that the obtaining module provided in this embodiment is configured to perform step A21, step A22, and step A23 in the first aspect of the embodiments of the present disclosure. For details about specific implementation processes of step A21, step A22, and step A23, refer to descriptions in the first aspect of the embodiments of the present disclosure. Details are not described again in this embodiment.

In this embodiment, the bot characteristic detection apparatus performs dynamic behavior detection on the malicious file in the sandboxes, collects, using the sandboxes, all network behaviors of the malicious file during a running process, outputs the dynamic behavior files that record the network behaviors, and extracts the bot characteristic from the dynamic behavior files. In this way, a signature of bot communication can be extracted. This helps implement detection of a malicious file based on a communication characteristic signature, and avoids false positives and false negatives reported due to interference from various variants of a bot file. In addition, because dynamic behavior detection is performed on the same malicious file in at least two sandboxes, during bot characteristic extraction, extracting the bot characteristic from the common characteristic of the dynamic behavior files respectively output by the at least two sandboxes can avoid that the extracted bot characteristic includes character strings randomly padded by different sandboxes in the dynamic behavior files and a character string used to describe information about a sandbox (for example, an IP address and a port address of the sandbox), thereby improving accuracy of the bot characteristic.

A third aspect of the embodiments of the present disclosure provides a gateway device, including one or more processors, a memory, a communications bus, and one or more programs, where the processors and the memory are connected using the communications bus, the one or more programs are stored in the memory, the one or more programs include an instruction, and when the instruction is executed by the gateway device, the gateway device performs the method according to any one of the first aspect of the embodiments of the present disclosure to the sixth implementation of the first aspect of the embodiments of the present disclosure.

A fourth aspect of the embodiments of the present disclosure provides a computer readable storage medium that stores one or more programs. The one or more programs include an instruction. When the instruction is executed by a gateway device, the gateway device performs the method according to any one of the first aspect of the embodiments of the present disclosure to the sixth implementation of the first aspect of the embodiments of the present disclosure.

DESCRIPTION OF EMBODIMENTS

Figure 1:
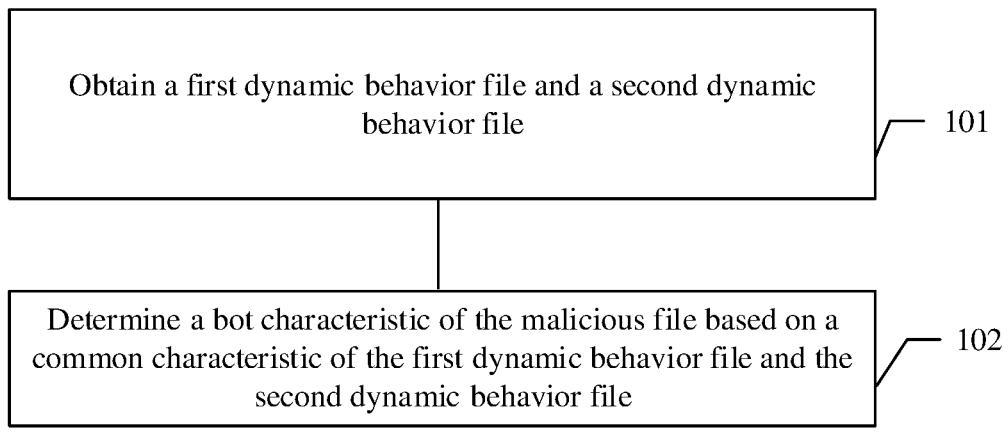
FIG. 1 is a schematic flowchart of an embodiment of a bot characteristic detection method according to the present disclosure.

The following explains and describes, using FIG. 1 as an example, a bot characteristic detection method provided in the embodiments. Referring to FIG. 1, FIG. 1 is a schematic flowchart of an embodiment of a bot characteristic detection method according to the present disclosure. This embodiment of the present disclosure is executed by a computer device. Optionally, the computer device may be a universal gateway device, a home gateway device, a router, a gateway device manager, or the like. The universal gateway device may be an access network gateway device, an enterprise gateway device firewall, a switch, or the like, which is not limited herein. All the foregoing devices are referred to as "gateway devices" in this embodiment.

In this embodiment, the solution is described using an example in which the execution body is a gateway device. After receiving service packets, the gateway device determines, from the service packets, a series of service packets that are used to carry a same file, or that is, a session that is used to carry a same file, and re-assembles the series of service packets for restoration, to obtain a file carried by a payload part of the series of packets. When determining that a file is a malicious file, the gateway device detects a bot characteristic of the malicious file using the bot characteristic detection method in this embodiment in order to synchronize the obtained bot characteristic to another hardware firewall device in a network or antivirus software installed on a personal computer, thereby improving a malicious file detection effect and improving a security protection level of a network.

As shown in FIG. 1, the bot characteristic detection method in this embodiment includes the following steps.

Step 101. A gateway device obtains a first dynamic behavior file and a second dynamic behavior file.

In this embodiment, the first dynamic behavior file is a behavior file resulting from dynamic behavior detection performed on a malicious file in a first sandbox, and the second dynamic behavior file is a behavior file resulting from dynamic behavior detection performed on the malicious file in a second sandbox. The malicious file is a file used by an attacker to infect an attacked host as a zombie host in a botnet. A sandbox is a virtual system program, and is intended to provide a security mechanism in order to provide an isolated environment for a program in execution. A program running in the sandbox does not generate a permanent impact on hardware. In this embodiment, dynamic behavior detection is performed on the malicious file in the sandboxes, to simulate network behaviors of the malicious file on an attacked host after the malicious file is run, and search for the bot characteristic of the malicious file in the behavior files generated upon the network behaviors.

There are a plurality of methods for obtaining the first dynamic behavior file and the second dynamic behavior file.

In a possible implementation, the gateway device first detects the malicious file. There are a plurality of methods for detecting the malicious file. The following describes one of the methods using an example. The gateway device obtains a to-be-detected file, and inputs the to-be-detected file into the first sandbox and the second sandbox separately. The first sandbox and the second sandbox may be located in the gateway device, or may be located in a device other than the gateway device, which is not limited herein.

There are a plurality of methods for the gateway device to obtain the to-be-detected file. For example, the gateway device re-assembles a plurality of received network packets of a same session for restoration, to generate a complete file, and uses the file as the to-be-detected file. The to-be-detected file may be a file that serves as a mail attachment and that is sent using a mail protocol packet, or may be a file that serves as a web page plug-in and that is sent using the HTTP. Alternatively, after generating a complete file, the gateway device determines whether the file is a suspected malicious file. If the file is a suspected malicious file, the gateway device determines that the file is a to-be-detected file. There are a plurality of methods for determining whether the file is a suspected malicious file. For example, the gateway device determines whether the file is a portable executable (PE) file, and if the file is a PE file, the gateway device determines that the file is a suspected malicious file. For another example, the gateway device performs matching between a uniform resource locator (URL) of the file and a locally pre-stored bot URL. If the matching is successful, the gateway device may directly determine that the file is a malicious file, that is, exclude the file from to-be-detected files. In this way, a quantity of the to-be-detected files can be reduced, and efficiency in detecting the bot characteristic can be improved.

The sandboxes perform two types of detection on the to-be-detected file, namely, static behavior detection and dynamic behavior detection. Static behavior detection is to obtain a parameter of the to-be-detected file by analyzing code content and a code structure of the to-be-detected file when the to-be-detected file is not running. In one common static behavior detection manner, a file type to which code of the to-be-detected file belongs is determined, and data in a predetermined location in the to-be-detected file is read based on a data structure corresponding to the file type. When this manner is used, information such as a file name, a file size, version information, and a digital signature of the to-be-detected file may be obtained. In another common static behavior detection manner, matching is performed between code of the to-be-detected file and a pre-stored known characteristic, and if the matching is successful, it is determined that the to-be-detected file includes the known characteristic.

Dynamic behavior detection includes when the to-be-detected file is running, obtaining a series of behaviors initiated by the to-be-detected file to an operating system during runtime, such as system service requesting, file reading and writing, registry modification, API calling, and network access, and recording information corresponding to each behavior in a dynamic behavior file. For example, behavior information of a file reading and writing behavior includes an operator of an executed action, a path involved in the executed action, and the like.

Static behavior detection is performed on the to-be-detected file in each sandbox, and a behavior file, to be specific, a static behavior file, resulting from static behavior detection performed on the to-be-detected file is output.

Dynamic behavior detection is further performed on the to-be-detected file in each sandbox, and a behavior file, to be specific, a dynamic behavior file, resulting from dynamic behavior detection performed on the to-be-detected file is output. Optionally, a dynamic behavior file output by each sandbox includes network packet data sent and received by the to-be-detected file. Optionally, the dynamic behavior file further includes other data such as a task identifier (ID), a file name, a dynamic behavior sequence, and a dynamic behavior operating object.

After a static behavior file and a dynamic behavior file that are output by the first sandbox, and a static behavior file and a dynamic behavior file that are output by the second sandbox are obtained, whether the to-be-detected file is a malicious file is determined based on the four files. Further, weight-based scoring is performed on at least one exception item in the four files output by the first sandbox and the second sandbox, and whether the to-be-detected file is a malicious file is determined based on a scoring result. A method for determining a malicious file is the other approaches, which is not described in detail herein. When the to-be-detected file is a malicious file, it is determined that the dynamic behavior file output by the first sandbox is the first dynamic behavior file, and that the dynamic behavior file output by the second sandbox is the second dynamic behavior file.

In an embodiment, a sandbox may not output a dynamic behavior file after performing dynamic behavior detection on a malicious file. This indicates that the malicious file does not perform a network behavior in the sandbox. Therefore, optionally, the to-be-detected file may be re-determined as a non-malicious file.

In another possible implementation of this embodiment, the gateway device first uses another method, for example, manual analysis, to examine a file to determine whether the file is a malicious file. When the file is a malicious file, the gateway device inputs the malicious file into the first sandbox and the second sandbox separately for dynamic behavior detection, obtains a dynamic behavior file output by the first sandbox and considers the dynamic behavior file as the first dynamic behavior file, and obtains a dynamic behavior file output by the second sandbox and considers the dynamic behavior file as the second dynamic behavior file.

Step 102. The gateway device determines a bot characteristic of a malicious file based on a common characteristic of the first dynamic behavior file and the second dynamic behavior file.

In this embodiment, there are a plurality of methods for determining the bot characteristic based on the common characteristic of the first dynamic behavior file and the second dynamic behavior file.

For example, a first preconfigured field is obtained, and whether content in the first preconfigured field in the first dynamic behavior file and content in the first preconfigured field in the second dynamic behavior file contain a same character string is determined. If the content in the first preconfigured field in the first dynamic behavior file and the content in the first preconfigured field in the second dynamic behavior file contain a same character string, it is determined that the bot characteristic of the malicious file includes the same character string and a location of the character string in the first preconfigured field. There are a plurality of methods for obtaining the first preconfigured field. For example, the first preconfigured field is stored in a first configuration table in the gateway device in advance, and the first preconfigured field is determined by reading the first configuration table. Optionally, the first preconfigured field included in the first configuration table may be updated at any time.

The field in this embodiment may be a specified storage location in a dynamic behavior file with a fixed structure. In a dynamic behavior file with a structure shown in Table 2, the field may be a task ID, a dynamic behavior sequence, a dynamic behavior operating object, or the like in level 1 items. When the dynamic behavior file includes network packet data, the field may alternatively be a field in a session packet that is encapsulated using a specified protocol.

For example, when a session packet is an application layer packet that is encapsulated using the HTTP, the first preconfigured field includes a payload field and/or a request field.

For another example, a second preconfigured field and preset content in the second preconfigured field are obtained. There are a plurality of obtaining methods. Optionally, the second preconfigured field and the preset content in the second preconfigured field are stored in a second configuration table in the gateway device in advance, and the second preconfigured field and the preset content in the second preconfigured field are determined by reading the second configuration table. Optionally, content in the second configuration table may be updated at any time. Optionally, the second preconfigured field is a field that may be modified by a bot program, and the preset content in the second preconfigured field is regular content in the second preconfigured field in a normal packet.

When the second preconfigured field exists in the common characteristic of the first dynamic behavior file and the second dynamic behavior file, and content in the second preconfigured field in the common characteristic is different from the preset content, it is determined that the bot characteristic of the malicious file includes the content in the second preconfigured field in the common characteristic.

Optionally, when a session packet is an application layer packet that is encapsulated using the HTTP, the second preconfigured field includes an agent field, and preset content in the agent field includes information about a user that sends a request.

In actual application, when a malicious file is generated in a botnet, payload fields of malicious files of a same type are the same. Because a hacker can configure and define the request field and/or the agent field, request fields and/or agent fields in different botnets may be different. Therefore, when bot characteristic detection is performed, the payload field may first be matched to determine a bot characteristic, and the request field and/or the agent field are/is then matched to group detected bot characteristics to bot characteristics of different botnets.

In this embodiment, the dynamic behavior file output by each sandbox includes network packet data. The network packet data includes session packets that are between the sandbox and different communication objects and that are generated during dynamic behavior detection performed on the malicious file. For determining of a bot characteristic, the bot characteristic may be searched for in a plurality of session packets in the dynamic behavior files.

The first dynamic behavior file and the second dynamic behavior file are result files resulting from dynamic behavior detection performed on the same malicious file in different sandboxes. Therefore, each session packet in the first/second dynamic behavior file is a session packet between the first/second sandbox and a same batch of communication objects. The same batch of communication objects includes n communication objects, where n is a positive integer. For an $i^{th}$ communication object (i is any positive integer greater than or equal to 1 but less than or equal to n), the first dynamic behavior file includes a session packet between the first sandbox and the $i^{th}$ object, and in a quintuple of the session packet, a source IP address and a source port are an IP address and a port of the first sandbox, respectively, and a destination IP address and a destination port are an IP address and a port of the $i^{th}$ object, respectively, and the second dynamic behavior file includes a session packet between the second sandbox and the $i^{th}$ object, and in a quintuple of the session packet, a source IP address and a source port are an IP address and a port of the second sandbox, respectively, and a destination IP address and a destination port are an IP address and a port of the $i^{th}$ object, respectively.

A session packet carries character strings such as a character string randomly padded by a sandbox and a character string used to describe information about the sandbox (for example, an IP address and a port address of the sandbox). These character strings are definitely not a bot characteristic. Therefore, when a bot characteristic is searched for, the bot characteristic of the malicious file is determined based on the common characteristic of the first dynamic behavior file and the second dynamic behavior file, avoiding that the determined bot characteristic includes these character strings. Further, the bot characteristic of the malicious file is determined based on a common characteristic of a first session packet in the first dynamic behavior file and a second session packet in the second dynamic behavior file. The first/second session packet is a session packet between the first/second sandbox and a same communication object. That is, a destination IP address of the first session packet is the same as a destination IP address of the second session packet, and a destination port of the first session packet is the same as a destination port of the second session packet.

Therefore, before the bot characteristic of the malicious file is determined, the session packets in the first dynamic behavior file are first paired with the session packets in the second dynamic behavior file, to determine session packets, in the first dynamic behavior file and the second dynamic behavior file, that are corresponding to a same communication object. There are a plurality of pairing methods. For example, for the first session packet in the first dynamic behavior file, after the destination IP address and the destination port of the first session packet are obtained, all the session packets in the second dynamic behavior file are traversed, to find a session packet, to be specific, the second session packet, that has the same destination IP address and the same destination port.

In this embodiment, there are a plurality of methods for determining the bot characteristic of the malicious file based on the common characteristic of the first session packet and the second session packet. For example, the common characteristic of the first session packet and the second session packet is first obtained, and the bot characteristic is then searched for in the common characteristic. For another example, a location (referred to as a first location for ease of description), in the first session packet, at which a bot characteristic occurs, and a location (referred to as a second location for ease of description), in the second session packet, at which a bot characteristic occurs are first determined, a common characteristic of packet content at the first location and packet content at the second location is then obtained, and the bot characteristic is determined based on the common characteristic. The first location and the second location may be at least one of the payload field, the request field, or the agent field described above.

In this embodiment, in a process of determining the bot characteristic based on the common characteristic of the first session packet and the second session packet, a step of preprocessing the first session packet and the second session packet is included to mark some character strings, in the first session packet and the second session packet, that are definitely not a bot characteristic such that the marked character strings are not compared when the first session packet and the second session packet are compared to obtain the common characteristic of the two session packets, thereby improving efficiency in obtaining the common characteristic. The following describes, using an example, one of the methods for determining the bot characteristic based on the common characteristic of the first session packet and the second session packet.

A preprocessing operation rule is obtained. The preprocessing operation rule instructs to remove a specified character in a packet. According to the preprocessing operation rule, first remaining content is obtained from the first session packet, and second remaining content is obtained from the second session packet. The first remaining content is packet content in the first session packet except the specified character, and the second remaining content is packet content in the second session packet except the specified character. The bot characteristic of the malicious file is determined based on a common characteristic of the first remaining content and the second remaining content.

There are a plurality of methods for obtaining the preprocessing operation rule. For example, the preprocessing operation rule is stored in a third configuration table in the gateway device in advance, and the preprocessing operation rule is determined by reading the third configuration table. Optionally, content in the third configuration table may be updated at any time.

There may be a plurality of preprocessing operation rules. For example, when a session packet is an HTTP packet, the preprocessing operation rule is used to instruct to remove at least one of the following character strings, an HTTP keyword in the session packet, a sandbox IP address or port in the session packet, or a CPU type in the session packet. The HTTP keyword may be a character string such as GET or HTTP1.1, which is not limited herein.

Optionally, in this embodiment, a protocol whitelist is further preset in the gateway device. The protocol whitelist stores at least one transport layer protocol. Optionally, the protocol whitelist may be updated at any time. Before the common characteristic of the first dynamic behavior file and the second dynamic behavior file is obtained, when a specific session packet exists in the two dynamic behavior files, it is determined that the specific session packet does not include a bot characteristic, and the specific session packet is excluded during obtainment of the common characteristic of the first dynamic behavior file and the second dynamic behavior file. The specific session packet is a session packet in whose quintuple a transport layer protocol is in the protocol whitelist. In this way, a quantity of session packets used to obtain the common characteristic can be reduced, and efficiency in determining the bot characteristic can be improved.

In this embodiment, the malicious file is simulated to run in the sandboxes, and behavior files, to be specific, the dynamic behavior files, that record network behaviors of the malicious file in this running process are collected such that the bot characteristic is extracted from the dynamic behavior files. This entire process can be automated, thereby improving efficiency in extracting the bot characteristic. In addition, because dynamic behavior detection is performed on the same malicious file in at least two sandboxes, during bot characteristic extraction, extracting the bot characteristic from the common characteristic of the dynamic behavior files respectively output by the at least two sandboxes can avoid that the extracted bot characteristic includes character strings randomly padded by different sandboxes in the dynamic behavior files and a character string used to describe information about a sandbox (for example, an IP address and a port address of the sandbox), thereby improving accuracy of the bot characteristic.

For ease of understanding, the following describes the bot characteristic detection method in this embodiment using an example with reference to an actual application scenario.

Figure 2:
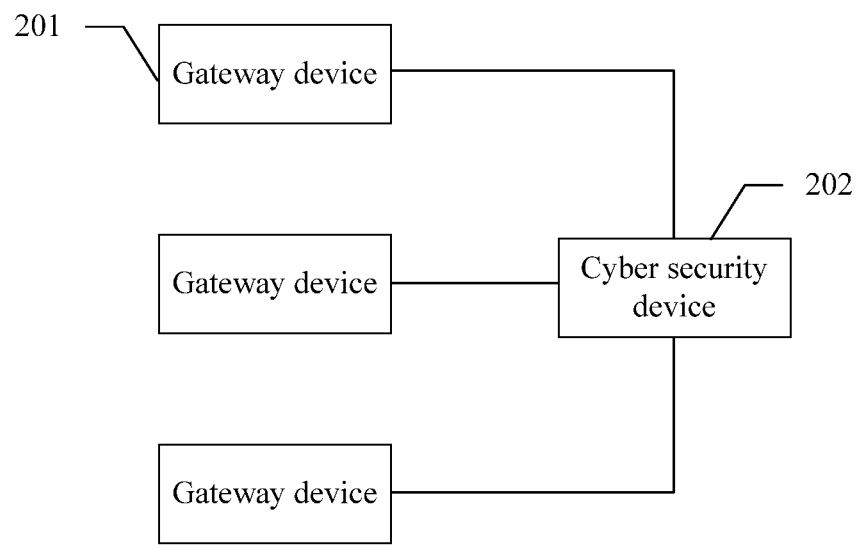
FIG. 2 is a schematic structural diagram of an embodiment of a communications system according to the present disclosure.

Referring to FIG. 2, FIG. 2 is a schematic structural diagram of an embodiment of a communications system according to the present disclosure. In this embodiment, the communications system includes at least one gateway device and a cyber security device 202. For ease of description, the following uses a gateway device 201 in the at least one gateway device as an example for description. After receiving service packets, the gateway device 201 determines, from the service packets, a series of service packets that are used to carry a same file, or that is, a session that is used to carry a same file, and re-assembles the series of service packets for restoration to obtain a file carried by a payload part of the series of packets. When a file is a suspected malicious file, the gateway device 201 uses the file as a to-be-detected file, and inputs the file into at least two local sandboxes separately.

There is a plurality of methods for the gateway device 201 to determine that a file is a suspected malicious file. For example, the gateway device 201 first performs matching between a URL of a file carried in a session and a locally pre-stored bot URL. If the matching is successful, the gateway device 201 may directly determine that the file is a malicious file. If the matching is not successful, the network device 201 further determines whether the network packet is a PE file. If the network packet is a PE file, the gateway device 201 determines that the file is a suspected malicious file.

Figure 3:
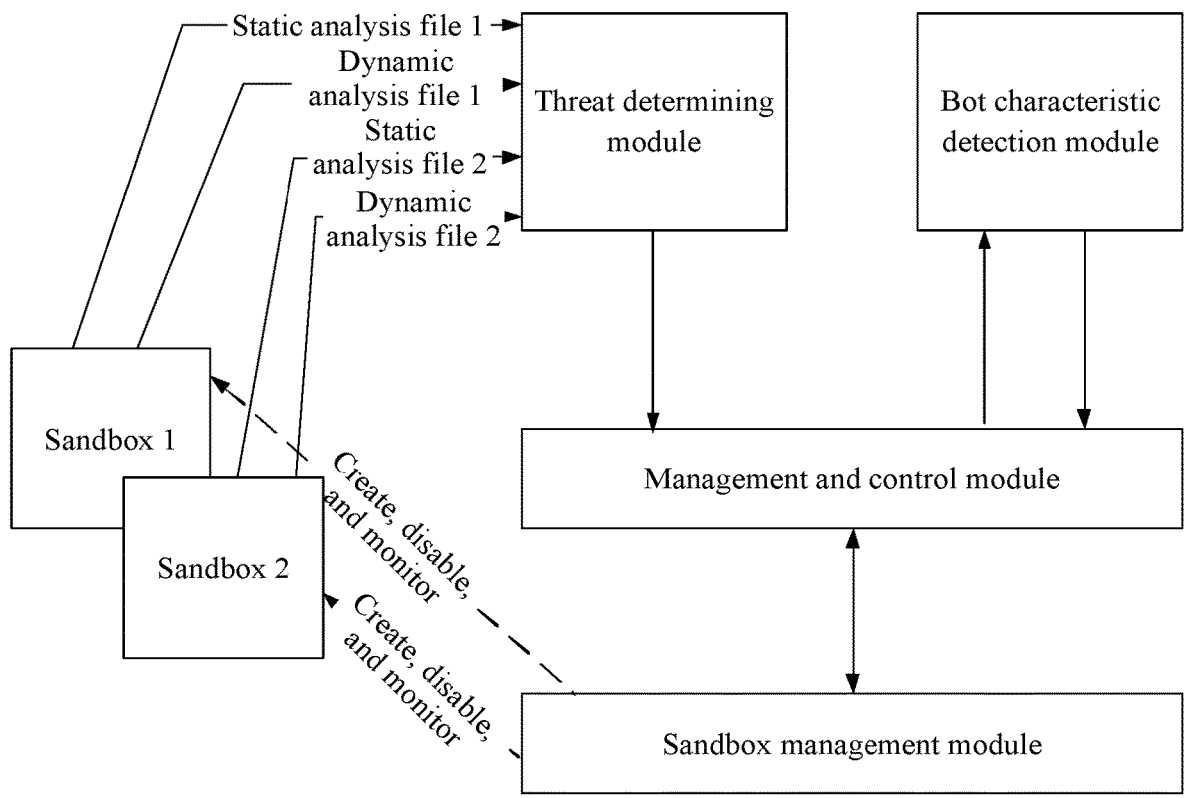
FIG. 3 is a schematic structural diagram of modules, in a gateway device configured to perform bot Trojan detection.

Referring to FIG. 3, FIG. 3 is a schematic structural diagram of modules, in the gateway device 201 configured to perform bot Trojan detection. The gateway device 201 includes at least two sandboxes, a threat determining module, a bot characteristic detection module, a management and control module, and a sandbox management module. The sandboxes, the threat determining module, the bot characteristic detection module, the management and control module, and the sandbox management module are function modules implemented by utilizing a software program. The management and control module is configured to manage the threat determining module and the bot characteristic detection module. The sandbox management module is configured to perform operations such as creating, disabling, and monitoring a sandbox.

After the gateway device 201 obtains a to-be-detected file, the sandbox management module creates a sandbox 1 and a sandbox 2. The gateway device 201 inputs the to-be-detected file into the sandbox 1 and the sandbox 2 separately. After receiving the to-be-detected file separately, the sandbox 1 and the sandbox 2 of the gateway device 201 perform static behavior detection and dynamic behavior detection on the to-be-detected file, and input detection results into the threat determining module. Further, the sandbox 1 inputs a static behavior file 1 and a dynamic behavior file 1 of the to-be-detected file into the threat determining module, and the sandbox 2 inputs a static behavior file 2 and a dynamic behavior file 2 of the to-be-detected file into the threat determining module.

As shown in Table 1, Table 1 is a schematic diagram of an embodiment of a structure of a static behavior file.

TABLE 1

| Serial number | Item | Sample data |
| --- | --- | --- |
| 1 | Task ID | |
| 2 | File name | |
| 3 | File size | |
| 4 | Digital signature | |
| 5 | Version information | |
| 6 | Wrapping information | |
| 7 | Whether to uninstall a program | |
| 8 | Result of analyzing a malformed Win32 PE format | |
| 9 | Malicious API sequence matching | |

TABLE 1-continued

| Serial number | Item | Sample data |
|---|---|---|
| | hit count | |
| 9 | File uniqueness signature | |
| 10 | File stream AV signature | |

As shown in Table 2, Table 2 is a schematic diagram of an embodiment of a structure of a dynamic behavior file.

TABLE 2

| Serial number | Level 1 item | Level 2 item | Sample data |
|---|---|---|---|
| 1 | Task ID | | |
| 2 | File name | | |
| 3 | Dynamic behavior sequence | | |
| 4 | Dynamic behavior operating object | | |
| 5 | Network packet data | Session packet 1 | |
| | | Session packet 2 | |
| | | ... | |
| | | Session packet n | |

The threat determining module determines whether the to-be-detected file is a malicious file based on the static behavior files 1 and 2 and the dynamic behavior files 1 and 2. Further, the threat determining module performs weight-based scoring on an exception item in the four files, and determines, based on a scoring result, whether the to-be-detected file is a malicious file. How weight-based scoring is performed is the other approaches, and details are not described herein.

The threat determining module sends a determining result to the management and control module such that the management and control module notifies the sandbox management module of the determining result. If the determining result indicates that the to-be-detected file is not a malicious file, the sandbox management module disables the sandbox 1 and the sandbox 2. If the determining result indicates that the to-be-detected file is a malicious file, the threat determining module sends the received dynamic behavior files 1 and 2 of the malicious file to the management and control module such that the management and control module forwards the two files to the bot characteristic detection module.

After receiving the dynamic behavior files 1 and 2 of the malicious file, the bot characteristic detection module obtains all session packets in the dynamic behavior file 1 and all session packets in the dynamic behavior file 2. The bot characteristic detection module obtains a protocol whitelist. The protocol whitelist stores at least one transport layer protocol. The bot characteristic detection module marks all session packets, in the dynamic behavior files 1 and 2, that use a transport layer protocol that is in the protocol whitelist, numbers unmarked session packets in the dynamic behavior file 1 sequentially, and numbers unmarked session packets in the dynamic behavior file 2 sequentially. Session packets, in the dynamic behavior files 1 and 2, that have a same destination IP address and a same destination port have a same number. During bot characteristic detection, any two session packets with a same number in the dynamic behavior files 1 and 2 are parsed to obtain a key characteristic in each session packet. The key characteristic includes a payload field, a request field, and an agent field. Further, the following uses a session packet numbered 1 in the dynamic behavior file 1 and a session packet numbered 1 in the dynamic behavior file 2 as an example for description.

Content in the session packet numbered 1 in the dynamic behavior file 1 is as follows:
GET/ip.txt HTTP1.1
User-Agent:Huai_Huai
Host:2.2.2.3
Cache-Control:no-cache
HTTP/1.1 200 OK
Content-Type:text/plain
Content-Range:bytes 0-18/19
Content-Length:19
Server:HFS 2.1d
Accept-Ranges:bytes
Content-Disposition:filename="ip.txt"
Last-Modified:Sat,12 May 2007
02:16:42 GMT
kvo2.2.2.60:8000kid Content in the session packet numbered 1 in the dynamic behavior file 2 is as follows:
GET/ip.txt HTTP1.1
User-Agent:Huai_Huai
Host:2.2.2.3
Cache-Control:no-cache
HTTP/1.1 200 OK
Content-Type:text/plain
Content-Range:bytes 0-18/19
Content-Length:19
Server:HFS 2.1d
Accept-Ranges:bytes
Content-Disposition:filename="ip.txt"
Last-Modified:Sat,12 May 2007
02:17:15 GMT
kvo2.2.2.18:8000kid For the two session packets, the following several schemes are used to detect a bot characteristic in the session packets.

Scheme 1:

Protocol identification is performed on the two session packets to obtain the following payload fields by parsing:

The session packet numbered 1 in the dynamic behavior file 1: Packet1.HTTP. payload=kvo2.2.2.60:8000kid; and The session packet numbered 1 in the dynamic behavior file 2: Packet2.HTTP. payload=kvo2.2.2.18:8000kid.

The payload fields are preprocessed according to a preprocessing operation rule. The preprocessing operation rule instructs to remove such character strings as sandbox IP:port "2.2.2.60:8000" in the fields. Further, a character string "2.2.2.60:8000" is removed when a common characteristic of the two packets is obtained subsequently.

For the payload fields in the two session packets, the two fields are compared to check whether the two fields contain a same character string. It can be obtained that kvo and kid are such character strings, that a location of kvo in the payload field is an address position 0 in a normal order, and a location of kid in the payload field is an address position 1 in a reverse order. Therefore, the bot characteristic includes kvo and kid in the payload field, and the locations of the two character strings in the payload field.

Scheme 2:

Protocol identification is performed on the two session packets to obtain the following request fields by parsing:

The session packet numbered 1 in the dynamic behavior file 1: Packet1.HTTP.requst=GET/ip.txt HTTP/1.1; and The session packet numbered 1 in the dynamic behavior file 2: Packet2.HTTP.requst=GET/ip.txt HTTP/1.1.

The request fields are preprocessed according to a preprocessing operation rule. The preprocessing operation rule instructs to remove HTTP keywords "GET" and "HTTP/1.1" in the fields. Further, two character strings "GET" and "HTTP/1.1" are removed when a common characteristic of the two packets is obtained subsequently.

For the request fields in the two session packets, the two fields are compared to check whether a same character string exists in the two fields. It can be obtained that/ip.txt is such a character string, and a location of the character string in the request field is an address position 0 in a normal order. Therefore, the bot characteristic includes the character string/ip.txt in the request field, and the location of the character string in the request field.

Scheme 3:

Protocol identification is performed on the two session packets to obtain the following agent fields by parsing:

The session packet numbered 1 in the dynamic behavior file 1: Packet1.HTTP.Agent=Huai_Huai; and The session packet numbered 1 in the dynamic behavior file 2: Packet2.HTTP.Agent=Huai_Huai.

For the agent fields in the two session packets, the two fields are compared to check whether a same character string exists in the two fields. It can be obtained that Huai_Huai is such a character string. This character string is different from preset content in the agent field. Therefore, it is determined that the bot characteristic includes the character string Huai_Huai in the agent field.

After detecting a bot characteristic in any two session packets with a same number in the dynamic behavior files 1 and 2, the bot characteristic detection module describes the bot characteristic to form a rule entry, and sends the rule entry to the management and control module.

The management and control module sends the rule entry to the cyber security device 202. The cyber security device 202 collects rule entries from gateway devices, and provides a bot characteristic data downloading function such that another device can download and store bot characteristic data from the cyber security device 202, and the gateway devices can identify, based on the bot characteristic data, whether a file is a malicious file.

The foregoing describes the bot characteristic detection method in the embodiments, and the following describes a bot characteristic detection apparatus in the embodiments.

Figure 4:
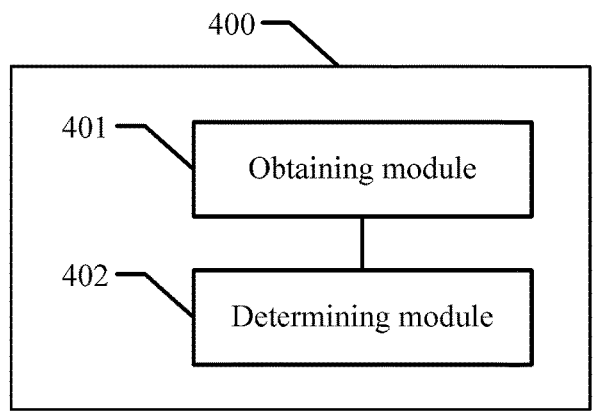
FIG. 4 is a schematic structural diagram of an embodiment of a bot characteristic detection apparatus according to the present disclosure.

Referring to FIG. 4, FIG. 4 is a schematic structural diagram of an embodiment of the bot characteristic detection apparatus in the embodiments. In this embodiment, the bot characteristic detection apparatus 400 includes an obtaining module 401 configured to obtain a first dynamic behavior file and a second dynamic behavior file, where the first dynamic behavior file is a behavior file resulting from dynamic behavior detection performed on a malicious file in a first sandbox, and the second dynamic behavior file is a behavior file resulting from dynamic behavior detection performed on the malicious file in a second sandbox, and a determining module 402 configured to determine a bot characteristic of the malicious file based on a common characteristic of the first dynamic behavior file and the second dynamic behavior file.

In some possible implementations of this embodiment, the first dynamic behavior file includes a first session packet, the second dynamic behavior file includes a second session packet, a destination IP address of the first session packet is the same as a destination IP address of the second session packet, and a destination port of the first session packet is the same as a destination port of the second session packet, and the determining module 402 is further configured to determine the bot characteristic of the malicious file based on a common characteristic of the first session packet and the second session packet.

In the foregoing implementations, optionally, the determining module 402 is further configured to obtain a preprocessing operation rule, where the preprocessing operation rule instructs to remove a specified character in a packet, obtain first remaining content from the first session packet and second remaining content from the second session packet according to the preprocessing operation rule, where the first remaining content is packet content in the first session packet except the specified character, and the second remaining content is packet content in the second session packet except the specified character, and determine the bot characteristic of the malicious file based on a common characteristic of the first remaining content and the second remaining content.

In the foregoing implementations, optionally, the determining module 402 is further configured to obtain a first preconfigured field, and determine whether content in the first preconfigured field in the first session packet and content in the first preconfigured field in the second session packet contain a same character string, and if the content in the first preconfigured field in the first session packet and the content in the first preconfigured field in the second session packet contain a same character string, determine that the bot characteristic of the malicious file includes the character string and a location of the character string in the first preconfigured field.

In the foregoing implementations, optionally, the determining module 402 is further configured to obtain a second preconfigured field and preset content in the second preconfigured field, and when the second preconfigured field exists in the common characteristic of the first session packet and the second session packet, and content in the second preconfigured field in the common characteristic is different from the preset content, determine that the bot characteristic includes the content in the second preconfigured field in the common characteristic.

In some possible implementations of this embodiment, the obtaining module 401 is further configured to obtain a static behavior file and a dynamic behavior file that are output by the first sandbox, and a static behavior file and a dynamic behavior file that are output by the second sandbox, where the static behavior file output by the first sandbox is a behavior file resulting from static behavior detection performed on a to-be-detected file in the first sandbox, the static behavior file output by the second sandbox is a behavior file resulting from static behavior detection performed on the to-be-detected file in the second sandbox, the dynamic behavior file output by the first sandbox is a behavior file resulting from dynamic behavior detection performed on the to-be-detected file in the first sandbox, and the dynamic behavior file output by the second sandbox is a behavior file resulting from dynamic behavior detection performed on the to-be-detected file in the second sandbox, determine whether the to-be-detected file is a malicious file based on the static behavior file and the dynamic behavior file that are output by the first sandbox, and the static behavior file and the dynamic behavior file that are output by the second sandbox, and when the to-be-detected file is a malicious file, determine that the dynamic behavior file output by the first sandbox is the first dynamic behavior file, and that the dynamic behavior file output by the second sandbox is the second dynamic behavior file.

In some possible implementations of this embodiment, the obtaining module 401 is further configured to obtain the malicious file, input the malicious file into the first sandbox and the second sandbox separately for dynamic behavior detection, and obtain a dynamic behavior file output by the first sandbox, and a dynamic behavior file output by the second sandbox.

The bot characteristic detection apparatus shown in FIG. 4 may be implemented by software or hardware integrated into a computer device. For additional functions that the apparatus can implement, refer to gateway device descriptions in the method embodiment, and details are not described herein again.

In this embodiment, the bot characteristic detection apparatus performs dynamic behavior detection on the malicious file in the sandboxes, collects, using the sandboxes, all network behaviors of the malicious file during a running process, outputs the dynamic behavior files that record the network behaviors, and extracts the bot characteristic from the dynamic behavior files. In this way, a signature of bot communication can be extracted. This helps implement detection of a malicious file based on a communication characteristic signature, and avoids false positives and false negatives reported due to interference from various variants of a bot file. In addition, because dynamic behavior detection is performed on the same malicious file in at least two sandboxes, during bot characteristic extraction, extracting the bot characteristic from the common characteristic of the dynamic behavior files respectively output by the at least two sandboxes can avoid that the extracted bot characteristic includes character strings randomly padded by different sandboxes in the dynamic behavior files and a character string used to describe information about a sandbox (for example, an IP address and a port address of the sandbox), thereby improving accuracy of the bot characteristic.

The foregoing describes the bot characteristic detection apparatus in the embodiments from a perspective of unitized function entities. The following describes the bot characteristic detection apparatus in the embodiments from a perspective of hardware processing.

Figure 5:
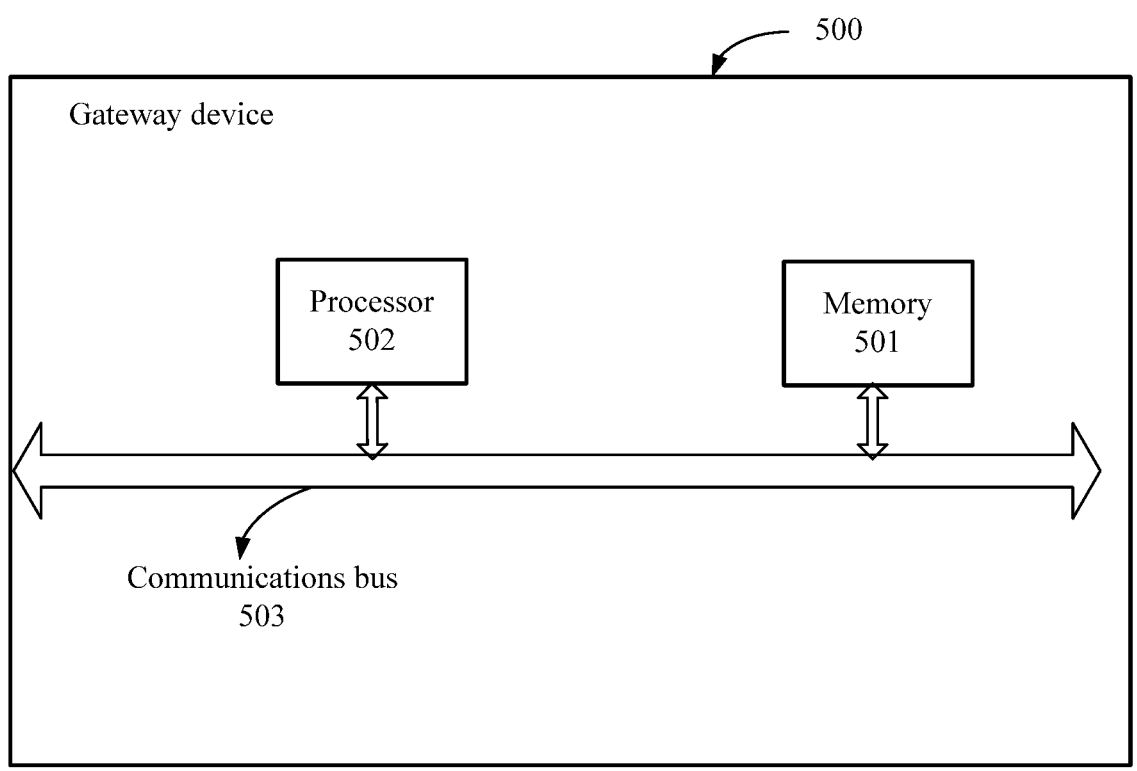
FIG. 5 is a schematic structural diagram of an embodiment of a gateway device according to the present disclosure.

Referring to FIG. 5, FIG. 5 is a schematic structural diagram of an embodiment of a gateway device 500 in the embodiments. In this embodiment, the gateway device 500 includes one or more processors 502, a memory 501, and a communications bus 503, where the processors 502 and the memory 501 are connected using the communications bus 503, one or more programs are stored in the memory 501, the one or more programs include an instruction, and when the instruction is executed by the one or more processors 502, the gateway device 500 performs obtaining a first dynamic behavior file and a second dynamic behavior file, where the first dynamic behavior file is a behavior file resulting from dynamic behavior detection performed on a malicious file in a first sandbox, and the second dynamic behavior file is a behavior file resulting from dynamic behavior detection performed on the malicious file in a second sandbox, and determining a bot characteristic of the malicious file based on a common characteristic of the first dynamic behavior file and the second dynamic behavior file.

Optionally, the first dynamic behavior file includes a first session packet, the second dynamic behavior file includes a second session packet, a destination IP address of the first session packet is the same as a destination IP address of the second session packet, and a destination port of the first session packet is the same as a destination port of the second session packet, and determining a bot characteristic of the malicious file based on a common characteristic of the first dynamic behavior file and the second dynamic behavior file includes determining the bot characteristic of the malicious file based on a common characteristic of the first session packet and the second session packet.

Optionally, determining the bot characteristic of the malicious file based on a common characteristic of the first session packet and the second session packet includes obtaining a preprocessing operation rule, where the preprocessing operation rule instructs to remove a specified character in a packet, obtaining first remaining content from the first session packet and second remaining content from the second session packet according to the preprocessing operation rule, where the first remaining content is packet content in the first session packet except the specified character, and the second remaining content is packet content in the second session packet except the specified character, and determining the bot characteristic of the malicious file based on a common characteristic of the first remaining content and the second remaining content.

Optionally, determining the bot characteristic of the malicious file based on a common characteristic of the first session packet and the second session packet includes obtaining a first preconfigured field, and determining whether content in the first preconfigured field in the first session packet and content in the first preconfigured field in the second session packet contain a same character string, and if the content in the first preconfigured field in the first session packet and the content in the first preconfigured field in the second session packet contain a same character string, determining that the bot characteristic of the malicious file includes the character string and a location of the character string in the first preconfigured field.

Optionally, determining the bot characteristic of the malicious file based on a common characteristic of the first session packet and the second session packet includes obtaining a second preconfigured field and preset content in the second preconfigured field, and when the second preconfigured field exists in the common characteristic of the first session packet and the second session packet, and content in the second preconfigured field in the common characteristic is different from the preset content, determining that the bot characteristic includes the content in the second preconfigured field in the common characteristic.

Optionally, obtaining a first dynamic behavior file and a second dynamic behavior file includes obtaining a static behavior file and a dynamic behavior file that are output by the first sandbox, and a static behavior file and a dynamic behavior file that are output by the second sandbox, where the static behavior file output by the first sandbox is a behavior file resulting from static behavior detection performed on a to-be-detected file in the first sandbox, the static behavior file output by the second sandbox is a behavior file resulting from static behavior detection performed on the to-be-detected file in the second sandbox, the dynamic behavior file output by the first sandbox is a behavior file resulting from dynamic behavior detection performed on the to-be-detected file in the first sandbox, and the dynamic behavior file output by the second sandbox is a behavior file resulting from dynamic behavior detection performed on the to-be-detected file in the second sandbox, determining whether the to-be-detected file is a malicious file based on the static behavior file and the dynamic behavior file that are output by the first sandbox, and the static behavior file and the dynamic behavior file that are output by the second sandbox, and when the to-be-detected file is a malicious file, determining that the dynamic behavior file output by the first sandbox is the first dynamic behavior file, and that the dynamic behavior file output by the second sandbox is the second dynamic behavior file.

Optionally, obtaining a first dynamic behavior file and a second dynamic behavior file includes obtaining the malicious file, inputting the malicious file into the first sandbox and the second sandbox separately for dynamic behavior detection, and obtaining a dynamic behavior file output by the first sandbox, and a dynamic behavior file output by the second sandbox.

It may be clearly understood by a person skilled in the art that, for the purpose of convenient and brief description, for a detailed working process of the gateway device 500, refer to a related gateway device description in the foregoing method embodiment, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation.

The technical solutions of the embodiments essentially, or the part contributing to the other approaches, or all or a part of the technical solutions may be implemented in a form of a software product. The computer software product is stored in a storage medium and includes several instructions for instructing a computer device (which may be a personal computer, a server, a network device, or the like) to perform all or a part of the steps of the method described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the embodiments, rather than limiting the embodiments. With reference to the foregoing embodiments, a person of ordinary skill in the art may make modifications to the technical solutions described in the embodiments or make equivalent replacements to some technical features thereof. However, these modifications or replacements do not make their corresponding technical solutions depart from the scope of the technical solutions of the embodiments.

What is claimed is:

1. A bot characteristic detection method, implemented by a computing device, wherein the bot characteristic detection method comprises:
   obtaining a to-be-detected file;
   separately inputting the to-be-detected file into a first sandbox and a second sandbox;
   obtaining a static behavior file and a first dynamic behavior file from the first sandbox and a static behavior file and a second dynamic behavior file from the second sandbox, wherein the static behavior file from the first sandbox is resulting from first static behavior detection performed on the to-be-detected file in the first sandbox, wherein the static behavior file from the second sandbox is resulting from second static behavior detection performed on the to-be-detected file in the second sandbox, wherein the first dynamic behavior file from the first sandbox is resulting from first dynamic behavior detection performed on the to-be-detected file in the first sandbox, and wherein the second dynamic behavior file from the second sandbox is resulting from second dynamic behavior detection performed on the to-be-detected file in the second sandbox;
   determining that the to-be-detected file is a malicious file based on the static behavior file and the first dynamic behavior file from the first sandbox and the static behavior file and the second dynamic behavior file from the second sandbox;
   determining a bot characteristic of the to-be-detected file based on a common characteristic of the first dynamic behavior file and the second dynamic behavior file, wherein the common characteristic comprises session packet data that is generated when the to-be-detected file accesses another communication object in a network;
   forming a rule entry based on the bot characteristic of the to-be-detected file; and
   sending the rule entry to a cyber security device.

2. The bot characteristic detection method of claim 1, wherein the first dynamic behavior file comprises a first session packet, wherein the second dynamic behavior file comprises a second session packet, wherein a destination Internet Protocol (IP) address of the first session packet is the same as a destination IP address of the second session packet, wherein a destination port of the first session packet is the same as a destination port of the second session packet, and wherein determining the bot characteristic of the to-be-detected file comprises determining the bot characteristic of the to-be-detected file based on a common characteristic of the first session packet and the second session packet.

3. The bot characteristic detection method of claim 2, wherein determining the bot characteristic of the to-be-detected file based on the common characteristic of the first session packet and the second session packet comprises:
   obtaining a preprocessing operation rule;
   processing the first session packet according to the preprocessing operation rule to remove a specified character in the first session packet to obtain first remaining content in the first session packet and processing the second session packet according to the preprocessing operation rule to remove the specified character in the second session packet to obtain second remaining content in the second session packet, wherein the first remaining content is packet content in the first session packet except the specified character, and wherein the second remaining content is packet content in the second session packet except the specified character; and
   determining the bot characteristic of the to-be-detected file based on a common characteristic of the first remaining content and the second remaining content.

4. The bot characteristic detection method of claim 2, wherein determining the bot characteristic of the to-be-detected file based on the common characteristic of the first session packet and the second session packet comprises:
   obtaining a first preconfigured field in the first session packet and a first preconfigured field in the second session packet;
   determining that content in the first preconfigured field in the first session packet and content in the first preconfigured field in the second session packet contain a same character string; and
   determining that the bot characteristic of the to-be-detected file comprises the same character string and a location of the same character string in first preconfigured fields when the content in the first preconfigured field in the first session packet and the content in the first preconfigured field in the second session packet contain the same character string.

5. The bot characteristic detection method of claim 2, wherein determining the bot characteristic of the to-be-detected file based on the common characteristic of the first session packet and the second session packet comprises:
obtaining a second preconfigured field and content in the second preconfigured field for each session packet; and
determining that the bot characteristic comprises content in the second preconfigured field in the common characteristic when the second preconfigured field exists in the common characteristic and that the content in the second preconfigured field in the common characteristic is different from preset content.

6. The bot characteristic detection method of claim 1, wherein the computing device comprises a gateway device, and wherein the first sandbox and the second sandbox are located within the gateway device.

7. The bot characteristic detection method of claim 1, wherein the first sandbox and the second sandbox are located within a second computing device that is different from the computing device.

8. The bot characteristic detection method of claim 1, wherein the to-be-detected file comprises a file that serves as a mail attachment in a mail protocol packet.

9. The bot characteristic detection method of claim 1, wherein the to-be-detected file comprises a file that serves as a web page plug-in and is received using Hyper Text Transfer Protocol (HTTP).

10. A bot characteristic detection method, implemented by a computing device, wherein the bot characteristic detection method comprises:
obtaining a to-be-detected file;
separately inputting the to-be-detected file into a first sandbox and a second sandbox;
obtaining a first dynamic behavior file and a second dynamic behavior file, wherein the first dynamic behavior file is resulting from first dynamic behavior detection performed on the to-be-detected file in the first sandbox, wherein the second dynamic behavior file is resulting from second dynamic behavior detection performed on the to-be-detected file in the second sandbox, and wherein the first dynamic behavior file and the second dynamic behavior file are obtained by:
obtaining a static behavior file and a dynamic behavior file from the first sandbox and a static behavior file and a dynamic behavior file from the second sandbox, wherein the static behavior file from the first sandbox is resulting from first static behavior detection performed on the to-be-detected file in the first sandbox, wherein the static behavior file from the second sandbox is resulting from second static behavior detection performed on the to-be-detected file in the second sandbox, wherein the dynamic behavior file from the first sandbox is resulting from the first dynamic behavior detection performed on the to-be-detected file in the first sandbox, and wherein the dynamic behavior file from the second sandbox is resulting from the second dynamic behavior detection performed on the to-be-detected file in the second sandbox;
determining that the to-be-detected file is a malicious file based on the static behavior file and the dynamic behavior file from the first sandbox and the static behavior file and the dynamic behavior file from the second sandbox; and
determining that the dynamic behavior file from the first sandbox is the first dynamic behavior file and that the dynamic behavior file from the second sandbox is the second dynamic behavior file when the to-be-detected file is the malicious file;
determining a bot characteristic of the to-be-detected file based on a common characteristic of the first dynamic behavior file and the second dynamic behavior file;
forming a first rule entry based on the bot characteristic of the to-be-detected file; and
sending the first rule entry to a cyber security device.

11. The bot characteristic detection method of claim 10, wherein the common characteristic comprises a network behavior corresponding to the to-be-detected file running in a network.

12. The bot characteristic detection method of claim 10, wherein the computing device comprises a gateway device, and wherein the first sandbox and the second sandbox are located within the gateway device.

13. The bot characteristic detection method of claim 10, wherein the first sandbox and the second sandbox are located within a second computing device that is different from the computing device.

14. The bot characteristic detection method of claim 10, wherein the to-be-detected file comprises a file that serves as a mail attachment in a mail protocol packet.

15. The bot characteristic detection method of claim 10, wherein the to-be-detected file comprises a file that serves as a web page plug-in and is received using Hyper Text Transfer Protocol (HTTP).

16. A computing device, comprising:
a non-transitory computer-readable storage memory configured to store one or more programs, wherein the one or more programs comprise an instruction; and
one of more computer hardware processors coupled to the non-transitory computer-readable storage memory, wherein when the instruction is executed by the one or more computer hardware processors, causes the computing device to be configured to:
obtaining a to-be-detected file;
separately inputting the to-be-detected file into a first sandbox and a second sandbox;
obtaining a static behavior file and a first dynamic behavior file from the first sandbox and a static behavior file and a second dynamic behavior file from the second sandbox, wherein the static behavior file from the first sandbox is resulting from first static behavior detection performed on the to-be-detected file in the first sandbox, wherein the static behavior file from the second sandbox is resulting from second static behavior detection performed on the to-be-detected file in the second sandbox, wherein the first dynamic behavior file from the first sandbox is resulting from first dynamic behavior detection performed on the to-be-detected file in the first sandbox, and wherein the second dynamic behavior file from the second sandbox is resulting from second dynamic behavior detection performed on the to-be-detected file in the second sandbox;
determining that the to-be-detected file is a malicious file based on the static behavior file and the first dynamic behavior file from the first sandbox and the static behavior file and the second dynamic behavior file from the second sandbox;
determining a bot characteristic of the to-be-detected file based on a common characteristic of the first dynamic behavior file and the second dynamic behavior file, wherein the common characteristic comprises session packet data that is generated when the to-be-detected file accesses another communication object in a network;

forming a rule entry based on the bot characteristic of the to-be-detected file; and sending the rule entry to a cyber security device.

17. The computing device of claim 16, wherein the computing device comprises a gateway device, and wherein the first sandbox and the second sandbox are located within the gateway device.

18. The computing device of claim 16, wherein the first sandbox and the second sandbox are located within a second computing device that is different from the computing device.

19. The computing device of claim 16, wherein the to-be-detected file comprises a file that serves as a mail attachment in a mail protocol packet.

20. The computing device of claim 16, wherein the to-be-detected file comprises a file that serves as a web page plug-in and is received using Hyper Text Transfer Protocol (HTTP).

\* \* \* \* \*